United States Patent [19]

Itoyama et al.

[11] Patent Number: 5,185,791
[45] Date of Patent: Feb. 9, 1993

[54] COMBINATION DESK AND WALL TELEPHONE SET

[75] Inventors: Katsumi Itoyama; Akira Sugiyama, both of Hino; Koichiro Suda, Fuchu, all of Japan

[73] Assignee: Kabushiki Kaisha Toshiba, Kawasaki, Japan

[21] Appl. No.: 599,824

[22] Filed: Oct. 19, 1990

[30] Foreign Application Priority Data

Oct. 21, 1989 [JP] Japan .................. 1-123337[U]

[51] Int. Cl.$^5$ .................................. H04M 1/00
[52] U.S. Cl. ............................ 379/435; 379/436
[58] Field of Search .......... 379/93, 98, 100, 110, 379/435, 436, 428, 419, 429, 437, 438, 440

[56] References Cited

U.S. PATENT DOCUMENTS

| | | | |
|---|---|---|---|
| 3,715,519 | 2/1973 | O'Leary | 379/435 |
| 3,818,150 | 6/1974 | Kunimine | 379/435 |
| 4,292,477 | 9/1981 | Adams et al. | 379/435 |
| 4,395,591 | 7/1983 | Kaczkos | 379/435 |
| 4,491,696 | 1/1985 | Haskins et al. | 379/435 |
| 4,517,420 | 5/1985 | Haskins | 379/435 |
| 4,741,033 | 4/1988 | Utoh et al. | 379/435 |
| 4,893,331 | 1/1990 | Horiuchi et al. | 379/93 |
| 4,972,457 | 11/1990 | O'Sullivan | 379/59 |
| 4,991,197 | 2/1991 | Morris | 379/58 |
| 5,008,927 | 4/1991 | Weiss et al. | 379/98 |

FOREIGN PATENT DOCUMENTS

| | | | |
|---|---|---|---|
| 0218294 | 4/1987 | European Pat. Off. | 379/436 |
| 0114054 | 6/1985 | Japan | 379/435 |
| 0140963 | 7/1985 | Japan | 379/435 |
| 0306746 | 12/1988 | Japan | 379/424 |
| 0258534 | 10/1989 | Japan | 379/436 |

OTHER PUBLICATIONS

Leich Sales Corporation, "Exciting News for Magneto Exchanges" Telephony, Apr. 1949.
Gotway, Reed, "Reversible Hook for Desk/Wall Convertible Telephone Sets", AT&T Technical Digest #73, Jan. 1984.
Motorola, "Sectel 2500", Jan. 1990.
Hawkins, "Future Office", Popular Science, Feb. 1990.

Primary Examiner—Curtis Kuntz
Assistant Examiner—William Cumming
Attorney, Agent, or Firm—Foley & Lardner

[57] ABSTRACT

In a combination desk and wall telephone set, a base member having a telephone back surface and an optional board therewithin is joined with a main body having a front surface on which an operation panel is arranged and a telephone circuit board therewithin. The back surface of the base member is formed tilted with respect to a front surface of the main body, and further, the joining direction of the base member to the main body is reversible. By reversing the joining direction, an appropriate inclination angle of the operation panel can be selectively obtained so as to be suitable for desk use or wall use. A recessed cord housing portion is formed at part of the back surface of the base member so that the surplus telephone cord is not seen from outside. This cord housing portion is formed at the bottom wall thereof with a plurality of connector housing portions having connection openings for respectively housing plural connectors mounted on the telephone circuit board and the optional board. Further, the base member is formed integral with a removable handset hanger for prevention of a handset from being dropped in use as a wall telephone set. The removed handset hanger can be housed within a hanger housing portion for prevention of its loss when not in use.

3 Claims, 5 Drawing Sheets

COMBINATION DESK AND WALL TELEPHONE SET

BACKGROUND OF THE INVENTION

1. Field of the Invention

The present invention relates generally to a telephone set, and more particularly to a telephone set in which an optional board can be housed.

2. Description of the Prior Art

There has been known a telephone set usable as both a desk telephone and a wall telephone such that a leg member with an appropriate height is removably attached onto the telephone back surface to tilt a front surface thereof on which a telephone operation panel is arranged. In the conventional telephone set, the leg member is removably and selectively attached to two different positions on the telephone back surface so that any one of two different tilt angles of the front surface suitable for both the desk and wall telephone sets can be selected. In the conventional telephone set, however, there exists a disadvantage in that the leg member must be prepared separately from a main telephone body and further the leg member mounting structure on the back surface of the telephone set is complicated and therefore troublesome from the production standpoint.

On the other hand, in general it is preferable that an external telephone cord connected to the telephone set via a connector is housed within the telephone set so that the surplus cord is not seen from outside. In the conventional telephone set, the surplus cord is usually housed inside the leg member or within a space between the leg member and the telephone back surface. For instance, in the case of desk telephone set, the leg member is attached to the telephone back surface at the same position as a telephone cord connector and the surplus cord is housed within the leg member. In the case of wall telephone set, on the other hand, the leg member is attached to the telephone back surface at a position different from the telephone cord connector, and the surplus cord is housed within a space between the leg member and the telephone back surface. In the conventional telephone set, therefore, there exists a problem in that the surplus cord is not satisfactorily housed so as not to be seen from outside.

Further, there is known a telephone set in which an optional board is additionally mountable for functional expansion. The optional board is a HIU board on which a headset interface unit (HIU) is mounted to allow a headset to be usable or a DIU board on which a data interface unit (DIU) is mounted to allow the telephone set to be connectable to a data terminal of a personal computer, for instance. These optional boards additionally provided within the telephone set are connected to a telephone circuit board within the main telephone body. In this case, it is preferable that the connector and cords for connecting these boards are also housed within the telephone set from the standpoint of external appearance.

SUMMARY OF THE INVENTION

With these problems in mind, therefore, it is the object of the present invention to provide a combination desk and wall telephone set such that an appropriate inclination angle of the telephone front surface can be selected so as to be suitable for desk use or wall use in as simple a structure as possible.

Another object of the present invention is to improve the structure for housing the surplus telephone cord within the telephone set.

Still a further object of the present invention is to provide a novel telephone set structure suitable for housing many connectors and connection cords increasing with increasing number of optional boards housed within the telephone.

In a first aspect of the combination desk and wall telephone set according to the present invention, the telephone set comprises a main body formed with a front surface on which a telephone operation panel is arranged and provided with a telephone circuit board, and a base member attached to a surface opposite to the front surface of the main body so as to provide a back surface of the telephone set. The back surface of the base member is tilted at a predetermined angle with respect to the front surface of the main body. A main connector for connecting the telephone cord extending from outside is mounted on a telephone circuit board within the main body. A main connector housing portion having a connection opening for the main connector is formed in the back surface of the base member. Since this connector housing portion is located at the center of the back surface of the base member, the joining direction of the base member to the main body is reversible. By reversing the joining direction, an appropriate inclination angle of the front surface of the main body can be selectively obtained so as to be suitable for desk use or wall use.

In a second aspect of the combination desk and wall telephone set according to the present invention, the base member is formed with a recessed cord housing portion for housing the surplus telephone cord in a portion of the back surface of the base member. This cord housing portion is formed with a main connector housing portion having a connection opening for a main connector mounted on the telephone circuit board.

In a third aspect of the combination desk and wall telephone set according to the present invention, an optional board can be housed within the base member. Further, the base member is formed at the back surface thereof with a plurality of connector housing portions having a connection opening, respectively for plural connectors mounted on the optional board and the telephone circuit board.

In a fourth aspect of the combination desk and wall telephone set according to the present invention, the base member is provided with a removable handset hanger for prevention of a handset from being dropped in use as a wall telephone set. The base member is further formed with a hanger housing portion for housing the removed handset hanger not in use.

DETAILED DESCRIPTION OF THE PREFERRED EMBODIMENTS

Figure 1A:
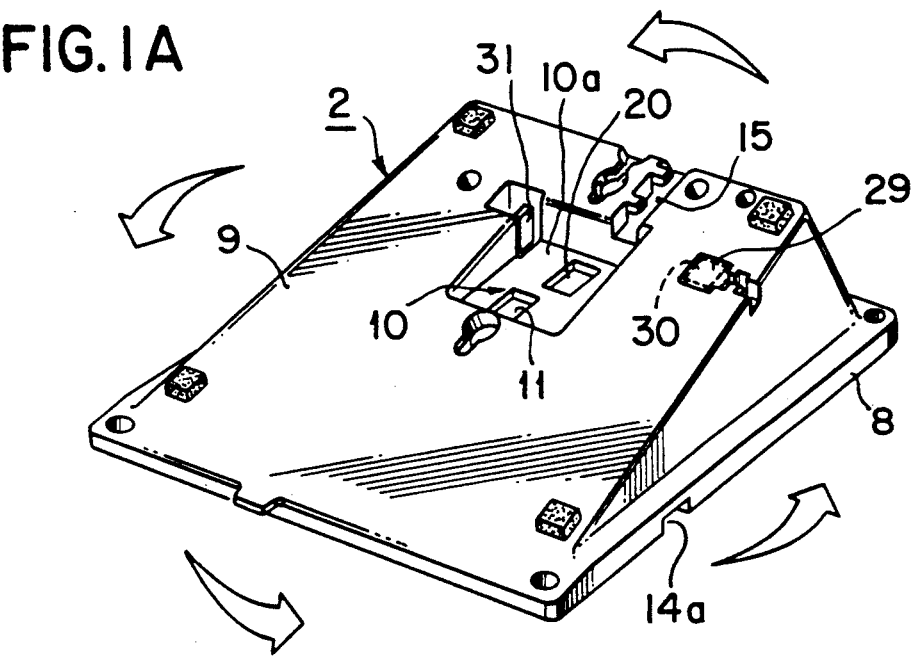
FIG. 1A is an exploded view showing a base member of the telephone set according to the present invention.
Figure 1B:
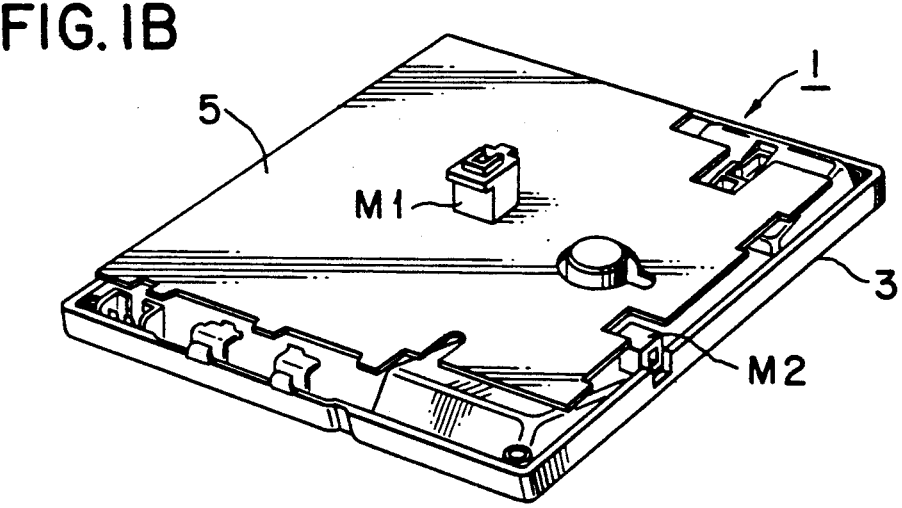
FIG. 1B is an exploded view showing a main body of the telephone set according to the present invention.

FIG. 1B is an exploded view showing a main body 1 and FIG. 1A shows a base member 2 of the telephone set according to the present invention. The main body 1 is formed with a front surface 3 on the lower side in FIG. 1B (not seen), on which a handset placing space and an operation panel are arranged. A plurality of keys 4 (FIG. 2) as dialing switches are arranged in prescribed order on the operation panel. On the inner side of the main body 1, a telephone circuit board 5 is disposed roughly in parallel to the front surface 3 thereof and fixed to appropriate stays 6 with screws. This telephone circuit board 5 is formed with a telephone circuit pattern (not shown) and provided with a main connector M1 (referred to as a modular jack generally) at roughly the center thereof and another connector M2 for connecting a handset 42 (FIG. 1B and FIG. 7) at a predetermined side end position (a connector using a modular jack is denoted by "M", hereinafter).

Figure 2:
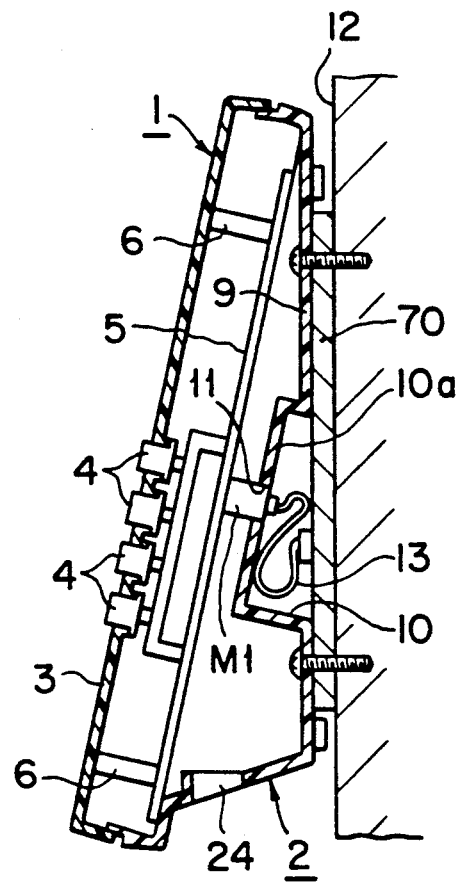
FIG. 2 is a sectional side view showing the telephone set according to the present invention when used as a wall telephone.
Figure 3:
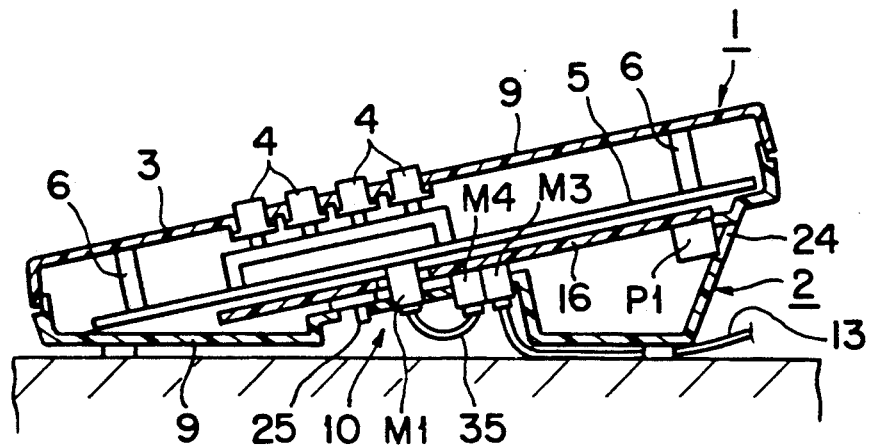
FIG. 3 is a sectional side view showing the telephone set according to the present invention when used as a desk telephone.

On the other hand, the base member 2 (see FIG. 1A) is formed with an engaging surface 8 joined one upon another with a surface opposite to the front surface 3 of the main body 1. The base member 2 is formed with a back surface 9 of the telephone set. This back surface 9 is tilted at a predetermined angle with respect to the engaging surface 8. The base member 2 is formed with a cord housing portion 10 recessed toward the engaging surface 8 near the center of the back surface 9 thereof. This cord housing portion 10 is further formed with a main connection opening 11 at a bottom wall 10a thereof. A head portion of the main connector M1 mounted on the telephone circuit board 5 is housed in this main connection opening 11. Since the position of this main connection opening 11 is located at the center of the base member 2, the main body 1 and the base member 2 can be fixed to each other with screws at four corners thereof, in such a way that both the elements 1 and, 2 can be joined with each other even when one element is reversed by 180 degrees with respect to the other element. When the base member 2 is joined with the main body 1 in the joining direction as shown in FIGS. 1 and 3, the telephone set can be used as a desk telephone. When the joining direction is reversed by 180 degrees as shown in FIG. 2, the telephone set can be used as a wall telephone. Here, even if the joining direction of the base member 2 to the main body 1 is reversed, the main connector M1 and the main connection opening 11 are both located at the center of the base member 2, and the two elements 1 and 2 can therefore be joined to each other after one element is reversed with respect to the other element. Further, the base member 2 is formed with a cutout portion 14a as a connection opening for a connector M2. In addition, the base member 2 is formed with another similar cutout portion 14b (see FIG. 4). These two cutout portions 14a and 14b are located symmetrically with respect to the main connection opening 11 so that the reversed base member 2 can be joined with the main body 1 so as to be suitable as a wall telephone.

FIG. 2 shows the wall telephone set according to the present invention fixed to a wall mounting plate 70 with screws (or hung on the plate 70 with hooks (not shown in FIG. 2)). This wall mounting plate is fixed to a wall surface 12. A telephone cord 13 led out of the wall mounting plate 70 is passed through the connection opening 11 and then connected to the main connector M1 on the telephone circuit board 5. The surplus telephone cord is housed within the cord housing portion 10 after being bundled. Therefore, the telephone cord 13 cannot be seen from outside.

FIG. 3 shows the telephone set used as a desk telephone. In the case of the desk telephone, a telephone cord 13 is led from the telephone via a cord guide groove 15 formed in the back surface 9 of the base member 2 so as to extend outside from the cord housing portion 10, as shown in FIG. 1(A).

Here it should be noted that the direction that the main body 1 is joined to the base member 2 as the wall telephone as shown in FIG. 2 is opposite to the direction as the desk telephone as shown in FIG. 3, in order that the front surface 3 can be tilted at an appropriate inclination angle for both wall and desk uses.

Figure 4:
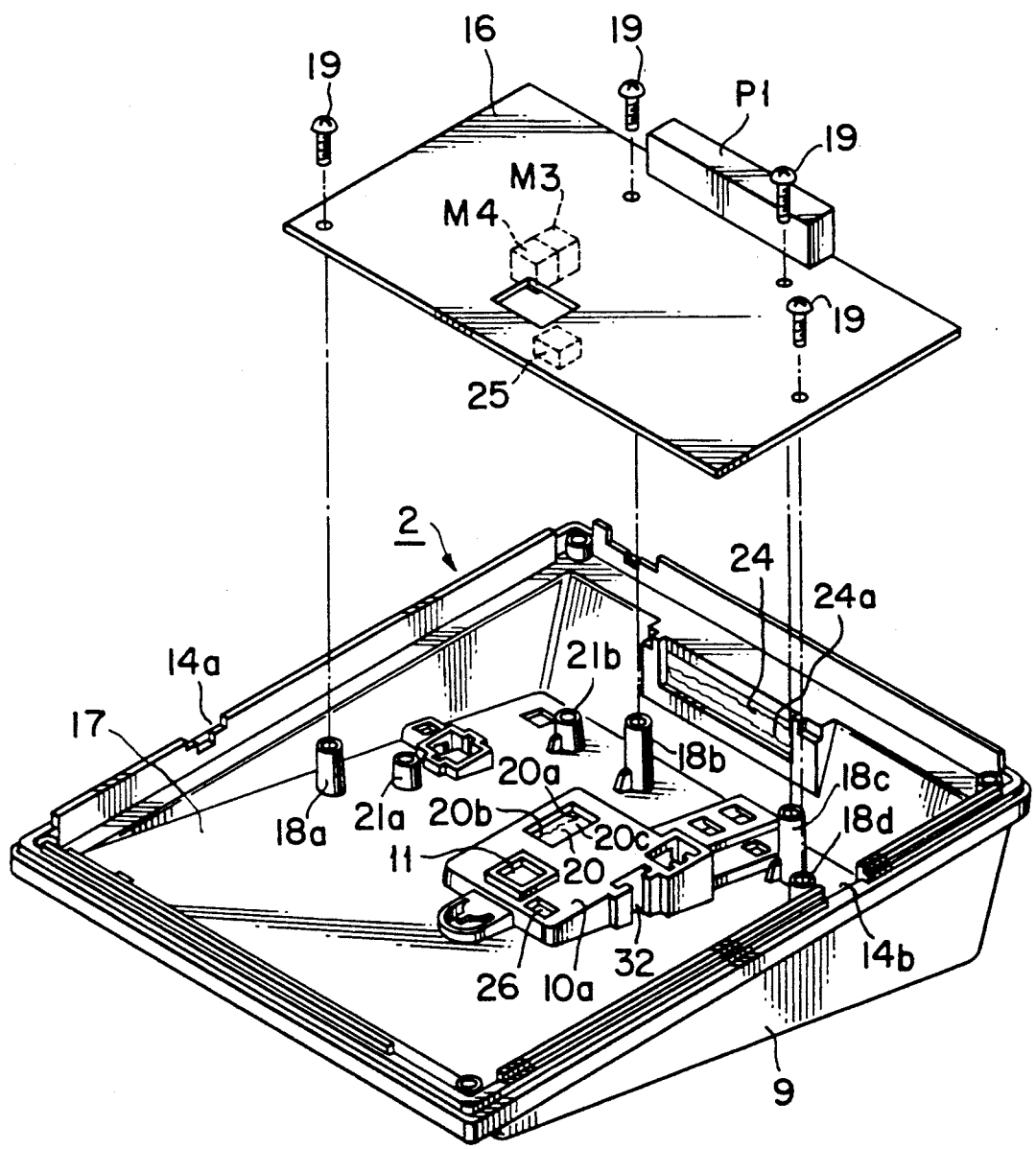
FIG. 4 is a perspective view showing the inside of the base member.

In FIG. 3, a data interface unit (DIU) board 16 is disposed within the base member 2 as one of optional boards. This DIU board 16 is fixed to the base member 2 as shown in FIG. 4. In more detail, four stays 18a, 18b, 18c and 18d are standingly disposed on an inner bottom surface 17 of the base member 2. The DIU board 16 is mounted on the upper ends of these stays and then fixed thereto by use of four screws 19. The DIU board 16 is formed with a DIU circuit pattern (not shown) for enabling communications with a data terminal. On the DIU board 16, a connector M3 for connecting the telephone cord 13 and a connector M4 for connecting the telephone circuit board 5 are mounted adjoining each other at predetermined positions. Two connection openings 20a and 20b (united to each other as a single connection opening 20 in practice) are formed in the bottom wall 10a of the cord housing portion 10 at such positions as to correspond to the two connectors M3 and M4. The heads of these two connectors M3 and M4 are housed within these two connection openings 20a and 20b. Further, a pin connector P1 complying with RS-232C, for instance connectable to a data terminal is mounted at the end of the DIU board 16. A connection opening 24 is formed in the side wall of the base member 2 at such a position as to correspond to the pin connector P1, so that the pin connector P1 is housed in this connection opening 24. Further, a switch 25 for selectively switching transmit routes of the DIU is mounted on the DIU board 16. This switch 25 is exposed to inside the cord housing portion 10 through a switch opening window 26.

As shown in FIG. 3, when the DIU board 16 is additionally mounted, the external telephone cord 13 is connected to the connector M3 on the DIU board 16, and not to the main connector M1 on the telephone circuit board 5. Further, the connector M4 on the DIU board 16 is connected to the main connector M1 on the telephone circuit board 5 via a connector cord 35. This connector cord 35 is housed within the cord housing portion 10, thus being not seen from outside.

As understood in comparison between FIGS. 2 and 3, the main connector M1 on the telephone circuit board 5 is connected to the external telephone cord 13 when the DIU board 16 is not mounted (FIG. 2), but connected to a connection cord 35 connected to the connector M4 on the DIU board 16 when the DIU board is mounted (FIG. 3). The reason why such two different circuit connections are consistent will be explained later with reference to FIG. 7. Only the advantages of such a connecting method as described above will be described hereinbelow. That is, since it is unnecessary to mount another connector connected to the DIU board 16 on the telephone circuit board 5 in addition to the main connector M1, it is possible to reduce the basic cost of the telephone set. Further, when another connector connected to the DIU board 16 is mounted on the telephone circuit board 5 in addition to the main connector M1, two connection openings for another connector must be formed in the base member 2 symmetrically with respect to the center thereof, so that the base member 2 can be reversed for desk use or wall use. In the present embodiment, however, there exists no such requirement as described above.

Figure 5:
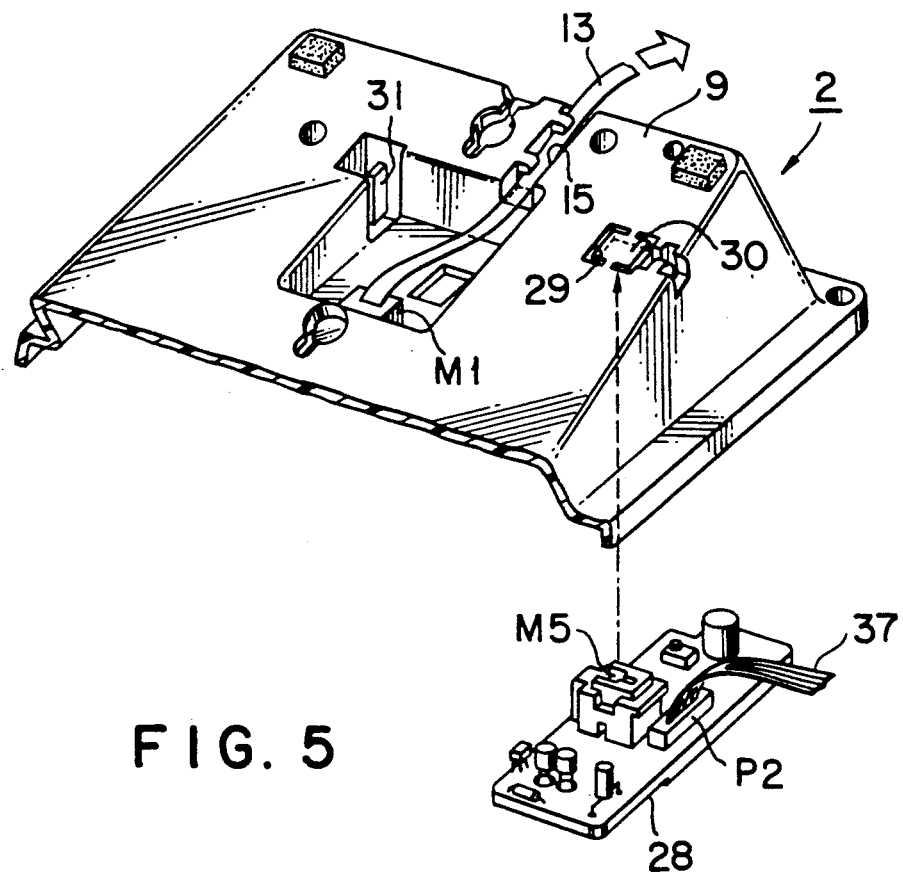
FIG. 5 is a perspective view showing a cord housing portion formed in the base member and a headset interface unit (HIU) board.
Figure 6:
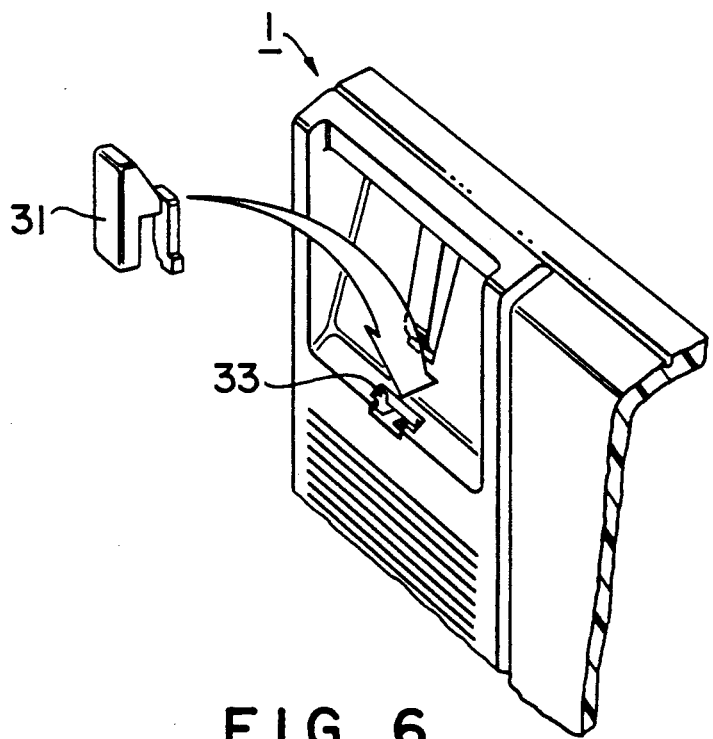
FIG. 6 is a perspective view for assistance in explaining a handset hanger to be mounted on the main body.

Further, another optional board such as a headset interface unit (HIU) board can be disposed within the base member 2. As shown in FIG. 4, the HIU board is fixed to two stays 21a and 21b standingly disposed on the inside bottom surface 17 of the base member 2 with screws. FIG. 5 shows the HIU board 28 on which a connector M5 connected to a headset and a pin connector P2 connected to the telephone circuit board 5 are both mounted. The pin connector P2 is connected to the telephone circuit board 5 via a connection cord 37 within the base member 2. When this HIU board 28 is mounted on the base member 2, the head of the connector M5 is housed in the connection opening 29 formed in the back surface 9 of the base member 2. This connection opening 29 is covered with a plastic tab (30) initially. However, this tab is removed when the HIU board 28 is additionally mounted. In the same way, it is also preferable to removably cover the connection openings 20 and 24 with plastic tabs 20c and 24a for the connectors M3, M4 and P1 on the DIU board and the opening window 26 for the switch 25 with plastic tab initially.

In the case of the wall telephone, generally a handset hanger 31 is required at a handset hanging position on the main body 1 to prevent the handset from being dropped. In this embodiment, as shown in FIG. 5, the hanger 31 is integrally molded with the base member 2. When the telephone set is used as a wall telephone, this hanger 31 is removed from the base member 2 and then inserted for use into a hanger groove (slot) 33 formed at a predetermined handset hanging position in the main body 1. After the hanger 31 has been removed, the hanger 31 can be housed within a hanger housing portion 32 formed inside the base member 2, as shown in FIG. 4, for prevention of its loss when not in use.

Figure 7:
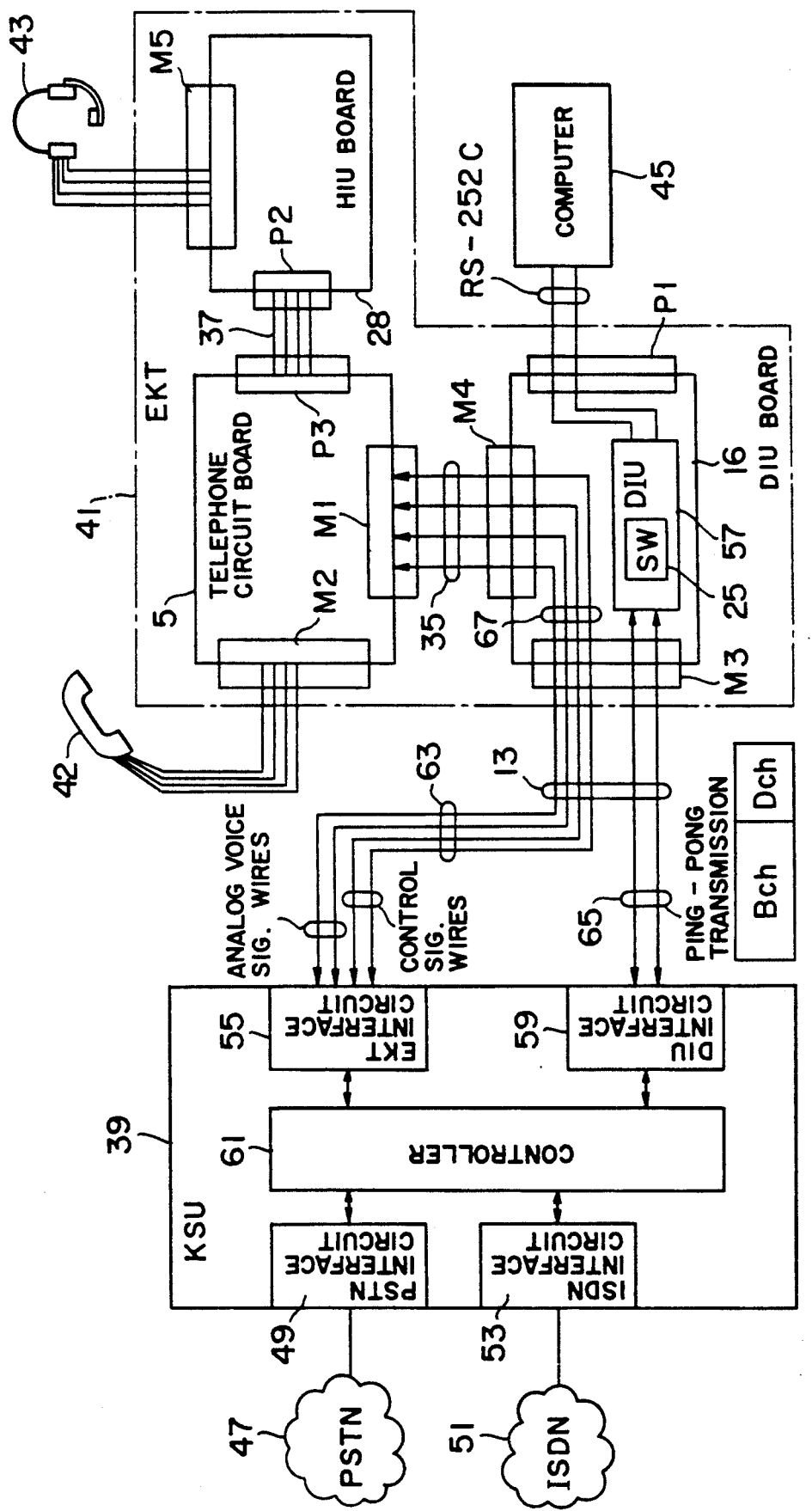
FIG. 7 is a wiring diagram for showing the connection relationship between various boards in the key telephone system using the telephone set according to the present invention.

FIG. 7 is a diagram showing the mutual connection relationship between various circuit boards provided for an electric key telephone (EKT) to which the structure according to the present invention is applied as a key telephone system. The reference numerals shown in FIGS. 1 to 5 have been retained for similar elements shown in FIG. 7.

In general, the key telephone system includes a key service unit (KSU) 39 provided with control and switching functions and an EKT 41 as an extension telephone set. In the system shown in FIG. 7, the telephone circuit board 5, the HIU board 28 and the DIU board 16 are all mounted on the EKT 41; a handset 42 is connected to the telephone circuit board 5; a headset 43 is connected to the HIU board 28; and a personal computer 45 is connected to the DIU board 16, respectively.

The KSU 39 includes a PSTN (public subscriber telephone network) interface circuit 49 for communications with a PSTN 47, an ISDN (integrated service digital network) interface circuit 53 for communications with an ISDN 51, an EKT interface circuit 55 for communications with an EKT 41, a DIN interface circuit 59 for communications with the DIU 57 on the DIU board 16, and a controller 61 for the entire system control and communication path switching operation.

An extension telephone cord 13 extends from the KSU 39 to the EKT 41, and connected to the connector M3 on the DIU board 16. This telephone cord 13 includes four signal wires 63 (referred to as EKT signal wires) extending from the EKT interface circuit 55 to transmit voice signals and control signals from the EKT 41 and two signal wires 65 (referenced to as DIU data wires) extending from the DIU interface circuit 59 to transmit data signals from the DIU 57. The EKT signal wires 63 are led from the connector M3 to the connector M4 via printed circuit wires 67 on the DIU board 16, and then connected to the main connector M1 on the telephone circuit board 5 via the connection cord 35. On the other hand, the DIU data wire 65 are connected to the DIU 57 mounted on the DIU board 16 and then connected to the personal computer 45 via the pin connector P1. As already explained, the interface unit between the DIU 57 and the personal computer 45 is an RS-232C, for instance. On the other hand, communications between the DIU 57 and the DIU interface circuit 59 is effected by half-duplex communications so-called ping-pong transmission using a (B+D) time sharing channel, for instance. The DIU 57 transforms signals so as to be transmissible using the RS-232C and the ping-pong transmission method.

As already explained, when the DIU board 16 is not mounted, the telephone cord 13 extending from the KSU 39 is directly connected to the main connector M1 on the telephone circuit board 5. In this case, the DIU data wires 65 of the telephone cord 13 are not connected.

As described above, it may be understood that various boards can be connected, without any electric circuit inconsistency, and irrespective of whether the DIU board 16 is mounted or not.

Further, the present invention has been explained by taking an EKT as an example. Without being limited thereto, however, it is of course possible to apply the present invention to standard telephone sets directly connected to the PSTN and an ISDN telephone sets directly connected to the INDN.

What is claimed is:

1. A combination desk and wall telephone set comprising:
   a main body formed with a front surface on which a telephone operation panel is arranged and provided with a telephone circuit board;
   a base member attached to a surface opposite to the front surface of the main body so as to provide a back surface of the telephone set;
   a main telephone cord connector housing portion having an opening for housing a telephone cord connector mounted on the telephone circuit board formed on a back surface of the base member, the back surface being tilted at a predetermined inclination angle with respect to the front surface wherein the telephone cord connector housing portion is located at a center of the back surface, whereby when the joining direction of the base member with the main body is reversed, either one of two inclination angles of the front surface for both a desk telephone and a wall telephone can be selectively obtained;

means to mount at least one optional board having an additional connector inside the base member;

at least one additional connector housing portion having an opening for housing the additional connector formed in the base member;

a recessed cord housing portion for housing surplus telephone cord, formed at a central part of the back surface of the base member, and wherein the main telephone cord connector housing portion is formed inside the recessed cord housing portion;

wherein the optional board further comprises a first additional connector for connecting a telephone cord led from outside, and a second additional connector connected to the main telephone cord connector on the telephone circuit board via a connection cord.

2. The telephone set of claim 1, wherein the base member further comprises a first and second additional connector housing portions having openings for housing the first and second additional connectors, respectively, said additional connector housing portions being formed inside the recessed cord housing portion.

3. The telephone set of claim 2, wherein the openings for housing the optional board additional connectors are closed by a tab to be removed when the optional board is used.

* * * * *